(12) United States Patent
Dobata et al.

(10) Patent No.: US 8,197,954 B2
(45) Date of Patent: Jun. 12, 2012

(54) BATTERY PACK

(75) Inventors: Tadayoshi Dobata, Osaka (JP); Hiroshi Yamamoto, Osaka (JP); Youg-hyun Shin, Osaka (JP); Rie Morisaki, Osaka (JP)

(73) Assignee: Hitachi Maxell Energy, Ltd., Otokuni-Gun, Kyoto (JP)

( * ) Notice: Subject to any disclaimer, the term of this patent is extended or adjusted under 35 U.S.C. 154(b) by 572 days.

(21) Appl. No.: 12/257,047

(22) Filed: Oct. 23, 2008

(65) Prior Publication Data
US 2009/0110964 A1 Apr. 30, 2009

(30) Foreign Application Priority Data

Oct. 26, 2007 (JP) .................................. 2007-279221

(51) Int. Cl.
H01M 2/00 (2006.01)
H01M 2/02 (2006.01)
H01M 2/04 (2006.01)

(52) U.S. Cl. .......................................... 429/7

(58) Field of Classification Search ........................ None
See application file for complete search history.

(56) References Cited

U.S. PATENT DOCUMENTS
2005/0112415 A1   5/2005  Takeshita et al.
2006/0099491 A1*  5/2006  Jeon ................................. 429/53
2010/0143793 A1   6/2010  Yamamoto FOREIGN PATENT DOCUMENTS
JP   2005-142153 A   6/2005
JP   2006-164601 A   6/2006
JP   2006-228715 A   8/2006
JP   2006-302662 A   11/2006
JP   2006-331818 A   12/2006

OTHER PUBLICATIONS

Korean Office Action for corresponding Korean Patent Application No. 10-2008-0104621, mailed on Jan. 19, 2011.

* cited by examiner

*Primary Examiner* — Patrick Ryan
*Assistant Examiner* — Wyatt McConnell
(74) *Attorney, Agent, or Firm* — Birch, Stewart, Kolasch & Birch, LLP

(57) ABSTRACT

A battery pack that allows a cover to be firmly fixed with a simple structure and that has superior impact resistance is provided. The battery pack is a battery pack 1 in which a protection circuit 10 and a protection element 7 are attached to a unit cell 2 and the protection circuit 10 and the protection element 7 are housed within a cover 11, the battery pack 1 including an internal frame 6 provided within the cover 11, wherein the internal frame 6 is fixed to the unit cell 2 and supports the protection circuit 10, a boss 13 projecting from the internal frame 6 which passes through a hole 12 formed in the cover 11, and the cover 11 is fixed to the internal frame 6 by melting and deforming the boss 13.

1 Claim, 7 Drawing Sheets

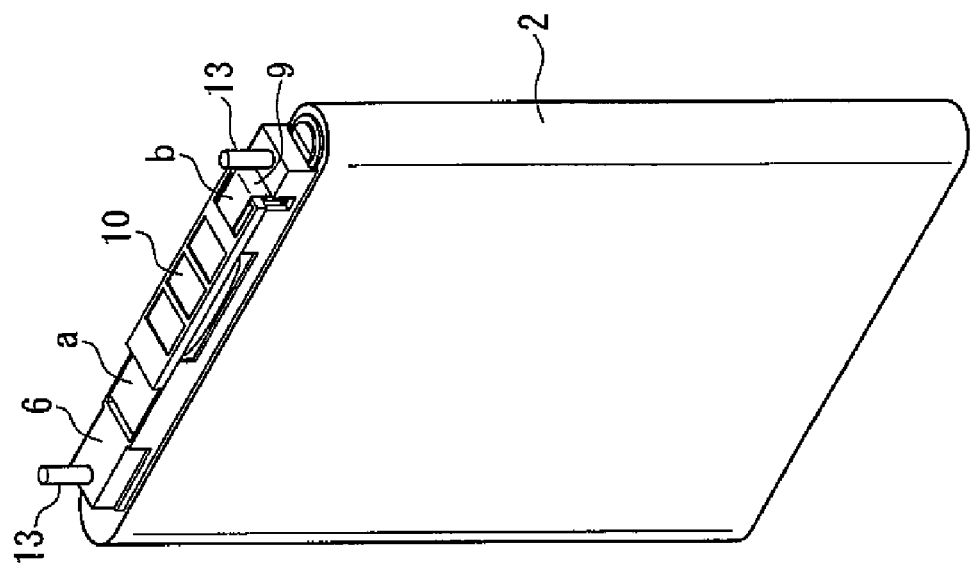
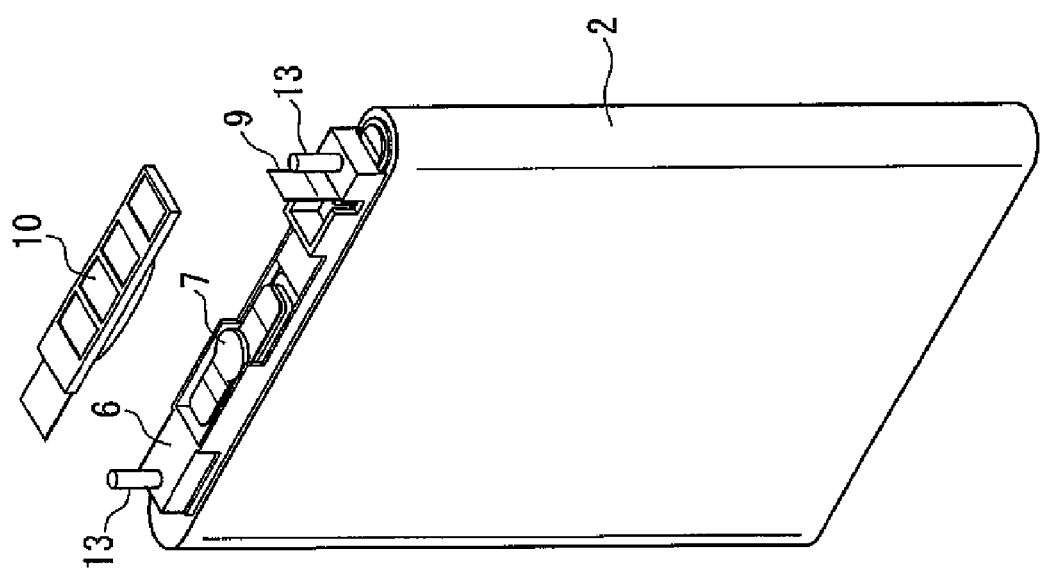

BATTERY PACK

BACKGROUND OF THE INVENTION

1. Field of the Invention

The present invention relates to a battery pack in which a protection circuit and a protection element are attached to a unit cell and the protection circuit and the protection element are housed within a cover.

2. Description of Related Art

In recent years, battery packs have been increasingly miniaturized, and many battery packs use a resin cover or a resin, frame-shaped case as an exterior component of the battery packs. A protection circuit that prevents overcharge, overcurrent, overdischarge, or the like is mounted on the battery packs. A resin internal frame is used to support the protection circuit.

FIGS. 7A and 7B are perspective views showing an example of a conventional battery pack. The perspective view of FIG. 7A shows the entire battery pack, and FIG. 7B is an enlarged view of portion C of FIG. 7A. A resin internal frame 101 is attached to a unit cell 100. A protection element (not shown) is housed within the interior of the internal frame 101, and the internal frame 101 supports a protection circuit 102.

The internal frame 101 is provided with a fixing claw 103, and a cover 104 is provided with a hole 105. The cover 104 is fixed to the internal frame 101 by engaging the fixing claw 103 of the internal frame 101 with the hole 105 of the cover 104.

Moreover, various types of configurations in which the cover is attached to a component corresponding to the internal frame are described in JP 2005-142153A, JP 2006-164601A, and JP 2006-302662A. JP 2005-142153A describes a structure in which an engaging claw formed on a frame portion enclosing a unit cell is engaged with an engaging hole formed in a cap portion (a cover), thereby attaching the cover to the frame portion. JP 2006-164601A describes a structure in which a fitting projection formed on a board holder is engaged with a fitting recess formed in an exterior case (a cover), thereby attaching the exterior case to the board holder. JP 2006-302662A describes a structure in which a screw is passed through a hole formed in a cover, and the screw is then threaded into a nut portion formed on a terminal portion of a unit cell, thereby attaching the cover to the unit cell.

On the other hand, in some structures for attaching the cover to the unit cell, integral molding is used rather than engagement to attach the cover to the unit cell so that the mechanical strength of the battery pack is increased.

However, with a (snap-fit) structure as described in FIGS. 7A and 7B and JP 2005-142153A and JP 2006-164601A in which a fitting projection formed on the internal frame is engaged with a fitting recess (or a hole) formed in the cover, there is a possibility that the engagement may be cancelled and the cover may be dislodged when the battery pack is subjected to an impact due to, for example, dropping. Thus, this structure is disadvantageous for increasing the impact resistance.

Moreover, a structure as described in JP 2006-302662A in which the cover is attached to the unit cell by screwing and a structure in which the cover is attached to the unit cell by integral molding require a larger number of components and a larger number of steps of the manufacturing process. Thus, these structures are disadvantageous in terms of cost.

SUMMARY OF THE INVENTION

The present invention has been conceived to solve the conventional problems as described above, and it is an object thereof to provide a battery pack that allows a cover to be firmly fixed with a simple structure and that has superior impact resistance.

In order to achieve this object, the battery pack of the present invention is a battery pack in which a protection circuit and a protection element are attached to a unit cell and the protection circuit and the protection element are housed within a cover, the battery pack including an internal frame provided within the cover, wherein the internal frame is fixed to the unit cell and supports the protection circuit, a boss projecting from the internal frame which passes through a hole formed in the cover, and wherein the cover is fixed to the internal frame by melting and deforming the boss.

The battery pack of the present invention allows the cover to be firmly fixed with a simple structure and has superior impact resistance.

BRIEF DESCRIPTION OF THE DRAWINGS

FIG. 2A shows a step of attaching a double-sided adhesive tape, FIG. 2B shows a step of welding a protection element 7 and a lead 9, and FIG. 2C shows a step of attaching the internal frame 6;

FIGS. 3D and 3E are perspective views showing a step of attaching a protection circuit 10 according to the embodiment of the present invention, where FIG. 3D shows a state immediately before the attachment of the protection circuit 10 and FIG. 3E shows a state where the protection circuit 10 has been attached;

FIG. 4F shows a state immediately before bosses 13 are passed through holes 12, FIG. 4G shows a state after the bosses 13 are passed through the holes 12 of the cover 11, and FIG. 4H shows a state after the bosses 13 are melted and deformed;

FIG. 5I shows a step of attaching the can-bottom cover 4 and FIG. 5J shows a state where the battery pack 1 is completed;

FIG. 7A shows the entire battery pack and FIG. 7B is an enlarged view of portion C of FIG. 7A.

DETAILED DESCRIPTION OF THE INVENTION

According to the battery pack of the present invention, the cover and the internal frame are fixed to each other by melting and deforming the boss integral with the internal frame. Thus, even with a simple structure, the cover and the internal frame are firmly fixed to each other, and the battery pack also has superior impact resistance. Moreover, according to the battery pack of the present invention, the number of components can be reduced and the manufacturing process can be simplified when compared with battery packs in which an attaching screw is used or the cover is molded integrally with the unit cell, so the battery pack of the present invention is also advantageous in terms of cost.

In the battery pack of the present invention, it is preferable that the melting point of the cover is higher than the melting point of the internal frame, and the difference between the melting point of the cover and the melting point of the internal frame is 10° C. or more. With this configuration, the cover, which is an externally visible component, can be prevented from being melted during melting of the boss of the internal frame, so that a good appearance can be obtained.

Moreover, it is preferable that the hole formed in the cover is in a position depressed below the surface of the cover and is surrounded by an inclined face. With this configuration, the thickness of a melted and deformed boss can be increased. This results in an increase in the strength of the boss against the shearing force, and accordingly the cover can be fixed more firmly.

Hereinafter, an embodiment of the present invention will be described in detail with reference to the accompanying drawings.

Embodiment 1

Figure 1:
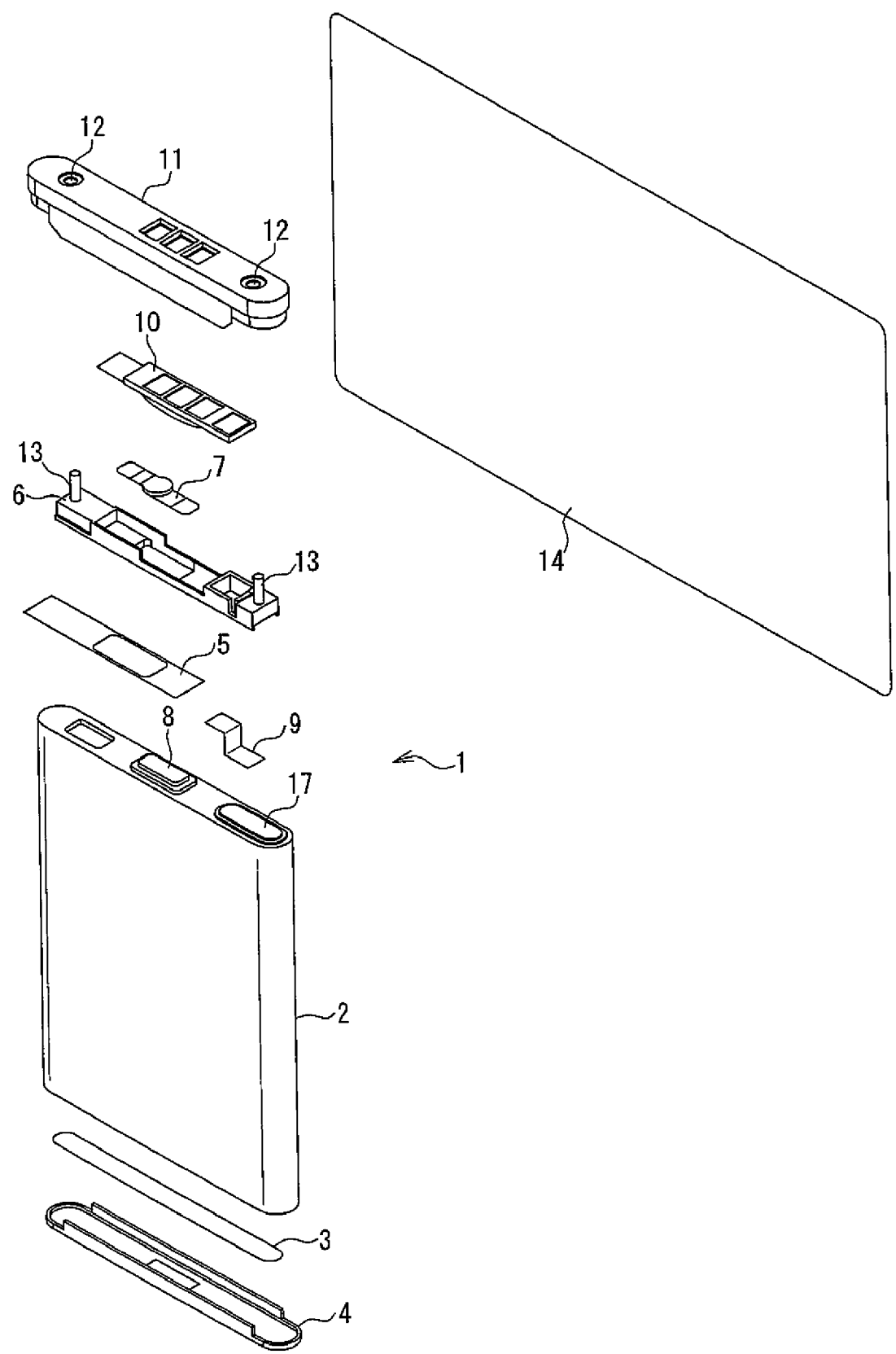
FIG. 1 is an exploded perspective view of a battery pack according to an embodiment of the present invention.

FIG. 1 is an exploded perspective view of a battery pack according to an embodiment of the present invention. First, the configuration of the battery pack will be schematically described with reference to FIG. 1. FIG. 1 shows a battery pack 1 and various attachments to be attached to the battery pack 1. A unit cell 2 has a power generating element contained in a thin, rectangular-shaped exterior can. The unit cell 2 is, for example, a rectangular-shaped lithium cell, and is used in cellular phones, mobile devices, or the like.

A can-bottom cover 4 is attached to the bottom of the unit cell 2 via a double-sided adhesive tape 3. An internal frame 6 is attached to the top of the unit cell 2 via a double-sided adhesive tape 5. A first end of a protection element 7 is joined to a terminal 8 of the unit cell 2 by welding, and a first end of a lead 9 is joined to a terminal 17 of the unit cell 2 by welding. The internal frame 6 made of a resin supports a protection circuit 10, and the protection circuit 10 is joined by welding to the lead 9 passing through a slit formed in the internal frame 6. The protection element 7 and the protection circuit 10 are protective means for preventing overcharge, overcurrent, overdischarge, or the like.

A cover 11 made of a resin has holes 12 formed therein. Bosses 13 projecting from the internal frame 6 are passed through the holes 12. The cover 11 is fixed to the internal frame 6 by melting and deforming the tips of the bosses 13 passed through the holes 12. As a result, the entire top of the unit cell 2 is covered with the cover 11. After the attachment of the cover 11, a label 14 is wrapped around the outer circumferential surface of the unit cell 2.

Figure 2C:
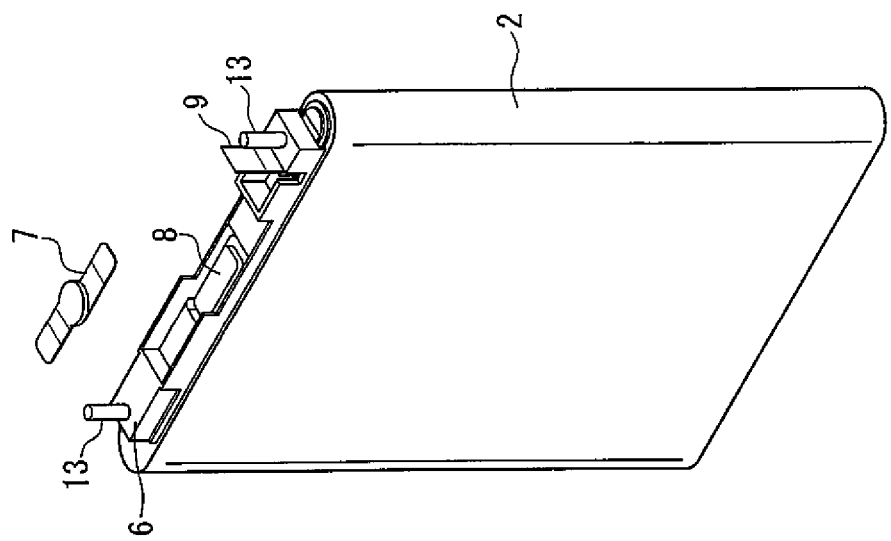
FIGS. 2A to 2C are perspective views showing steps until an internal frame 6 is fixed to a unit cell 2 according to the embodiment of the present invention, where
Figure 2B:
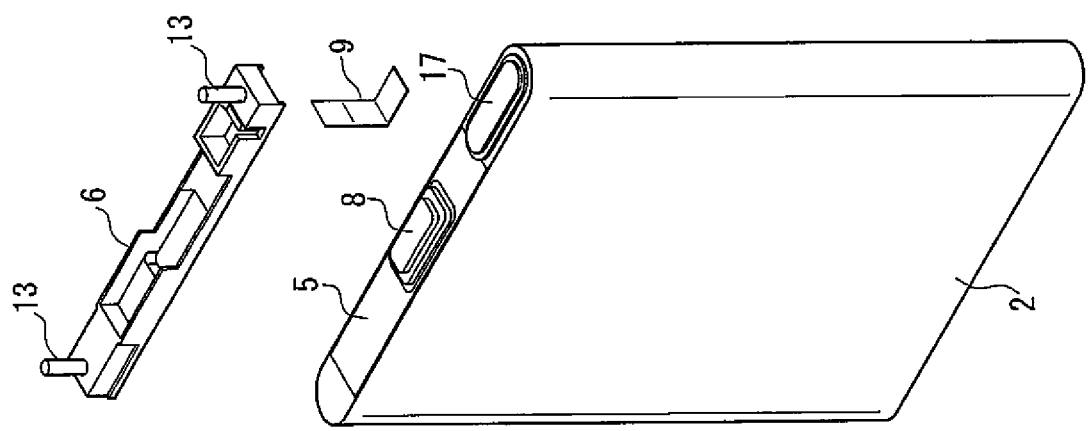
Figure 2A:
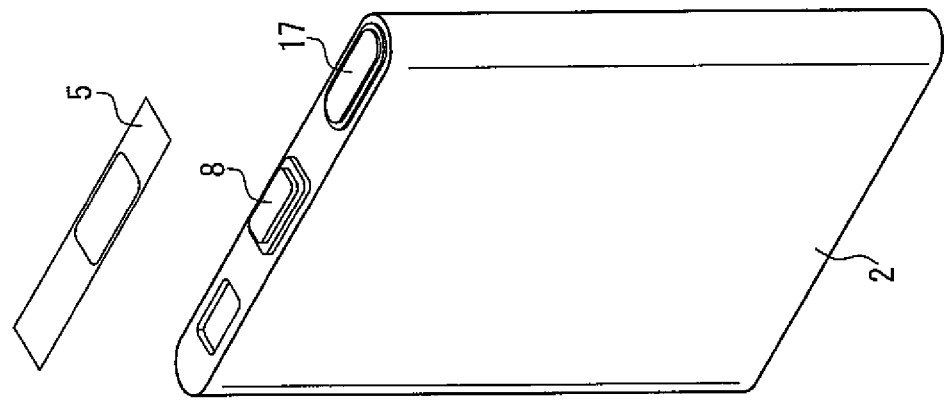

Hereinafter, the battery pack according to this embodiment will be described in greater detail with reference to FIGS. 2A to 5J. In FIGS. 2A to 5J, a manufacturing process of the battery pack according to this embodiment is illustrated step by step. FIGS. 2A to 2C show the steps until the internal frame 6 is fixed to the unit cell 2. FIG. 2A shows the step of attaching the double-sided adhesive tape, in which the double-sided adhesive tape 5 is attached to portions of the top of the unit cell 2 excluding the terminal 8 and 10 portions.

FIG. 2B shows the steps of welding the lead 9 and attaching the internal frame 6. The first end of the lead 9 is welded to the terminal 17 of the unit cell 2. Furthermore, the lead 9 is passed through the slit formed in the internal frame 6, and then the internal frame 6 is adhered to one side of the double-sided adhesive tape 5 attached to the top of the unit cell 2. FIG. 2C shows the step of welding the protection element 7. The first end of the protection element 7 is welded to the terminal 8 exposed in an opening of the internal frame 6.

FIGS. 3D and 3E show the step of attaching the protection circuit 10. FIG. 3D shows a perspective view of a state immediately before the protection circuit 10 is attached. FIG. 3E shows a perspective view of a state where the protection circuit 10 has been attached. The protection circuit 10 is placed on the internal frame 6, and then the lead 9 is bent toward the protection circuit 10. In this state, a second end of the protection element 7 is welded to one end of the protection circuit 10 (portion a of FIG. 3E), and a second end of the lead 9 is welded to the other end of the protection circuit 10 (portion b of FIG. 3E).

In the state shown in FIG. 3E, the internal frame 6 is attached to the unit cell 2 via the double-sided adhesive tape 5 (see FIG. 2C). On the other hand, in portion a, the protection circuit 10 is welded to the protection element 7 welded to the unit cell 2. Therefore, the internal frame 6 supports the protection circuit 10 that is firmly fixed to the top of the unit cell 2 via the protection element 7.

On the other hand, the protection circuit 10 is welded to the lead 9 that is passed through the slit in the internal frame 6 and that is welded to the terminal 8 of the unit cell 2 at the first end. Thus, the internal frame 6 is positioned under the protection circuit 10 that is firmly fixed to the top of the unit cell 2 via the lead 9. Therefore, the internal frame 6 is firmly fixed to the unit cell 2 via the protection circuit 10, the lead 9, and the double-sided adhesive tape 5.

Figures 4F, 4G, 4H:
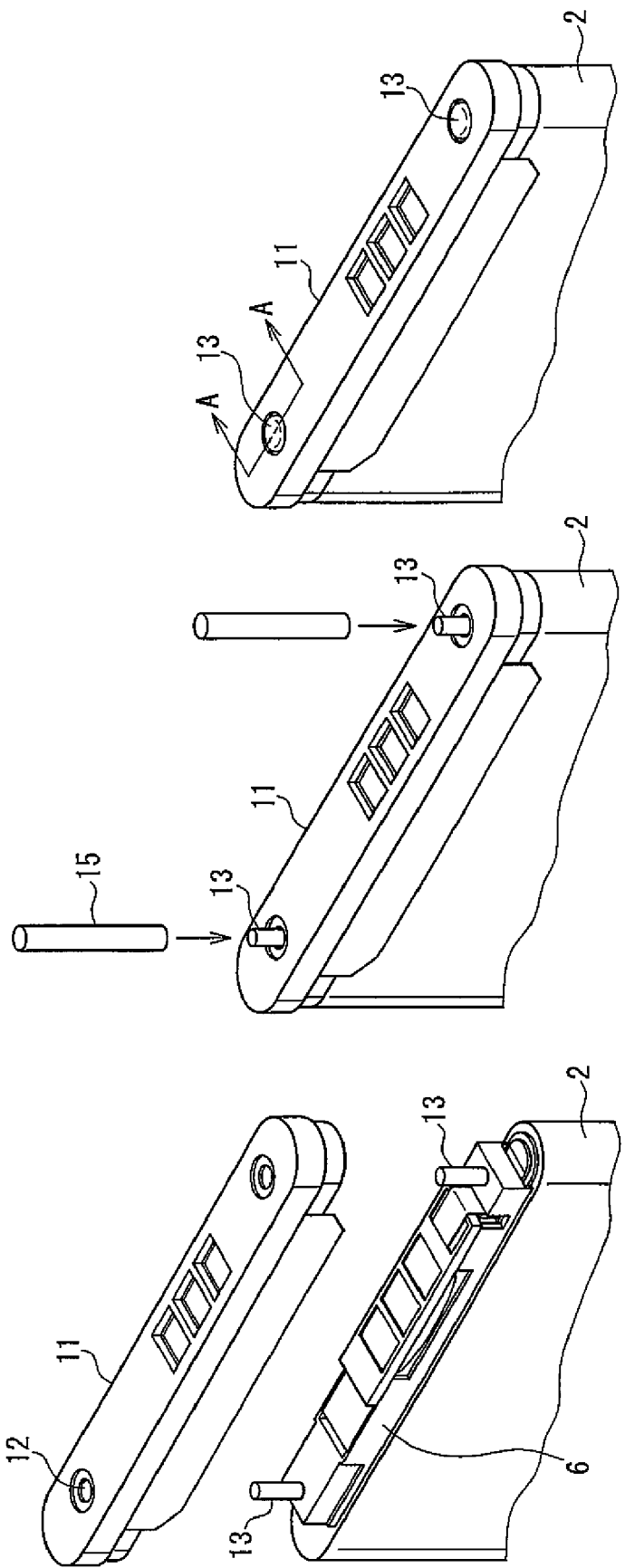
FIGS. 4F to 4H are perspective views showing a step of attaching a cover according to the embodiment of the present invention, where

FIGS. 4F to 4H show the step of attaching the cover. In the state shown in FIG. 4F, the bosses 13 of the internal frame 6 are passed through the holes 12 of the cover 11. FIG. 4G shows a state after the bosses 13 are passed through the holes 12 of the cover 11. In this state, heating rods 15 made of a metal are pressed against the bosses 13. Thus, a pressure is applied on the bosses 13 while the bosses 13 are melted, so that the bosses 13 are melted and deformed. FIG. 4H shows a perspective view after the bosses 13 are melted and deformed.

Figure 6A:
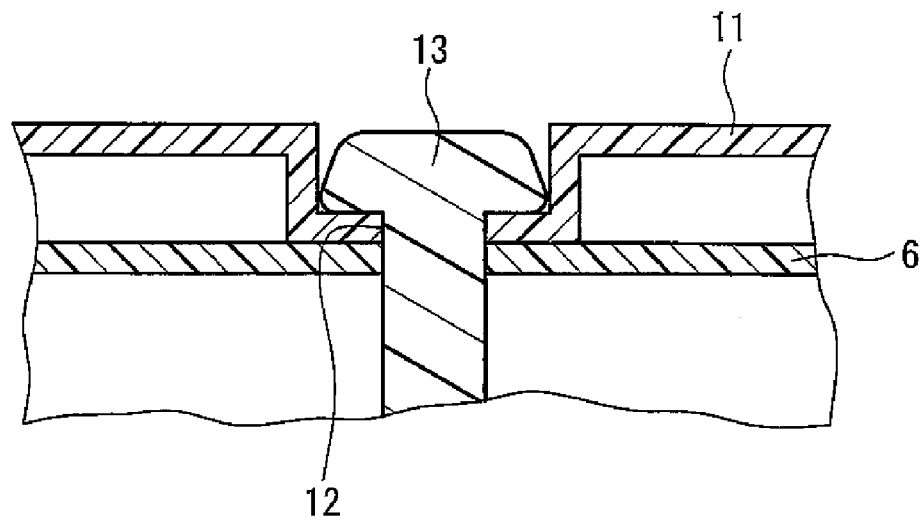
FIG. 6A is a cross-sectional view taken along line A-A of FIG. 4H.
Figure 6B:
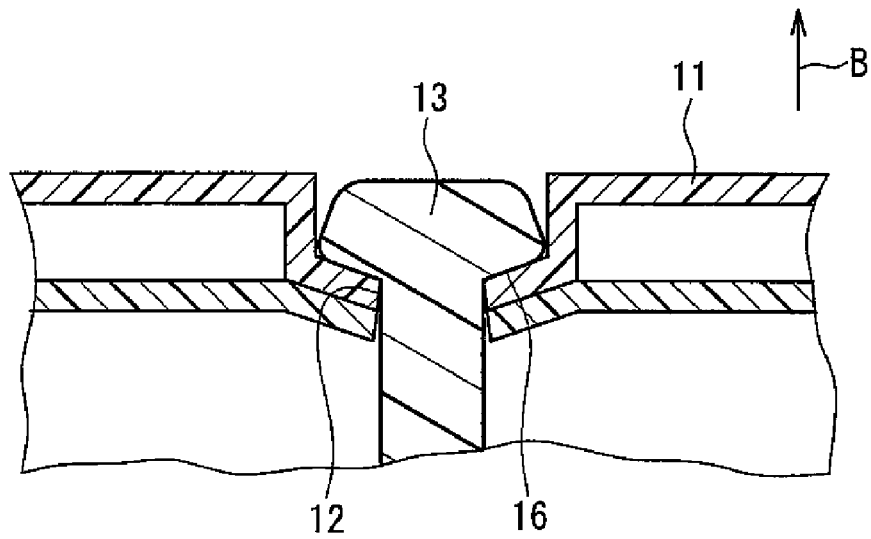
FIG. 6B shows a cross-sectional shape according to another example.
Figure 7A:
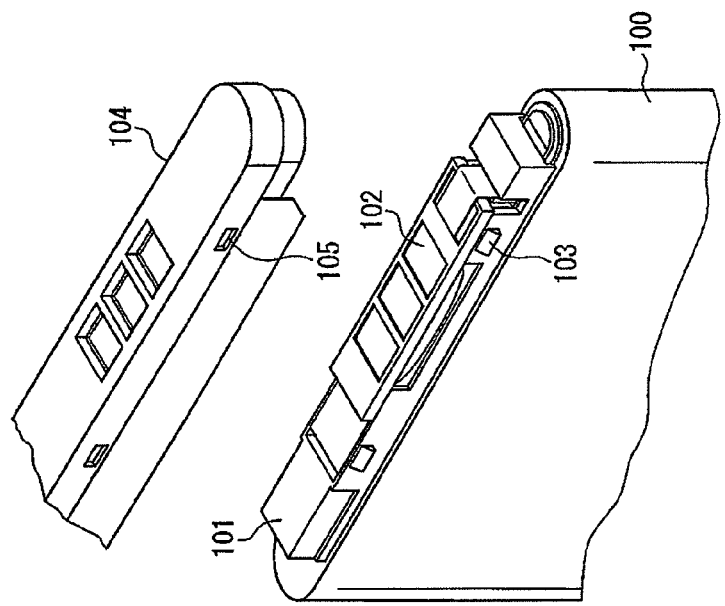
FIGS. 7A and 7B are perspective views showing an example of a conventional battery pack, where
Figure 7B:
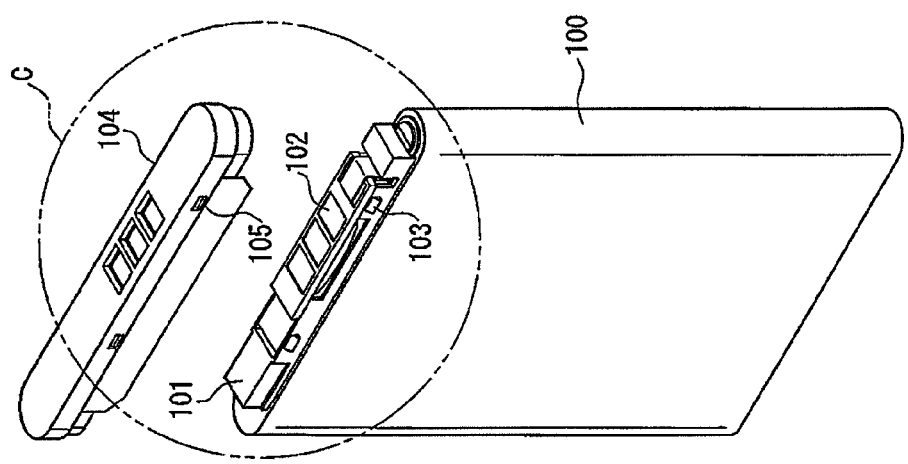

FIGS. 6A and 6B show cross-sectional views taken along line A-A of FIG. 4H. As shown in FIG. 6A, the tip of each of the bosses 13 after being melted and deformed has an increased external diameter, and the entire boss 13 is approximately T-shaped. The tip of the boss 13 having the increased external diameter functions as a stopper, so that the cover 11 is firmly fixed to the internal frame 6.

FIG. 6B shows another example of the cross-sectional shape. By surrounding the hole 12 that is in a position depressed below the surface of the cover 11 with an inclined face 16, the thickness of the tip of the boss 13 in the axial direction of the boss 13 is increased when compared with that of the boss 13 in FIG. 6A. This results in an increase in the strength against the shearing force that is generated when a force is exerted in a direction (the direction of arrow B) that dislodges the cover 11. This configuration is effective in a case where the cover needs to be fixed more firmly.

Here, by using a low-melting resin as the resin forming the internal frame 6 and using a high-melting resin as the resin forming the cover 11, the cover 11, which is an externally visible component, can be prevented from being melted during melting of the bosses 13 of the internal frame 6, and thus a good appearance can be obtained. More specifically, the melting point of the resin forming the cover 11 is preferably higher than the melting point of the resin forming the internal frame 6 by 10° C. or more.

As an example of combinations of the materials of the internal frame 6 and the cover 11, PP (polypropylene, melting point: 170° C.) and PC (polycarbonate, melting point: 240° C.) may be used as the materials of the internal frame 6 and the cover 11, respectively. Alternatively, PC (polycarbonate, melting point: 240° C.) and PET (polyethylene terephthalate, melting point: 260° C.) may also be used as the materials of the internal frame 6 and the cover 11, respectively.

Figure 5J:
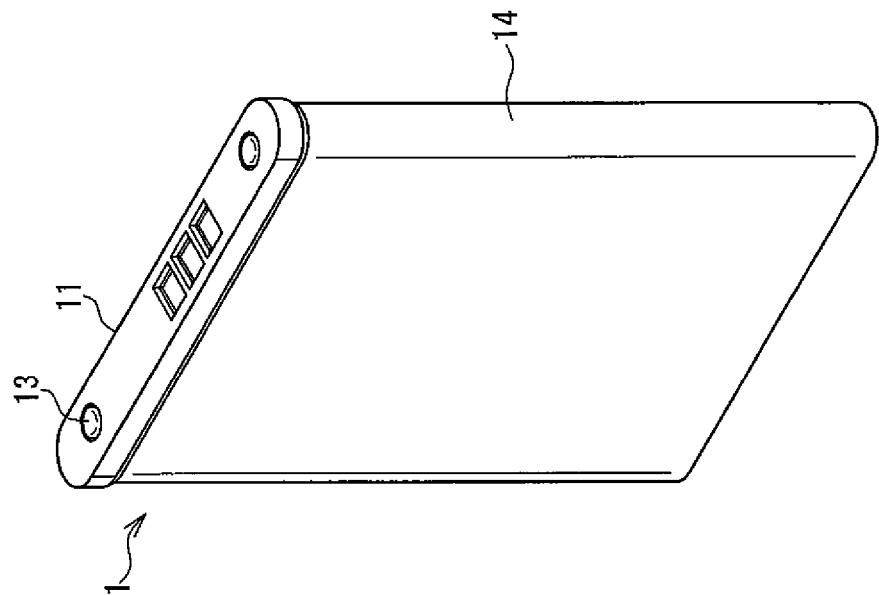
FIGS. 5I and 5J are perspective views showing steps from the attachment of a can-bottom cover to the completion of the battery pack according to the embodiment of the present invention, where
Figure 5I:
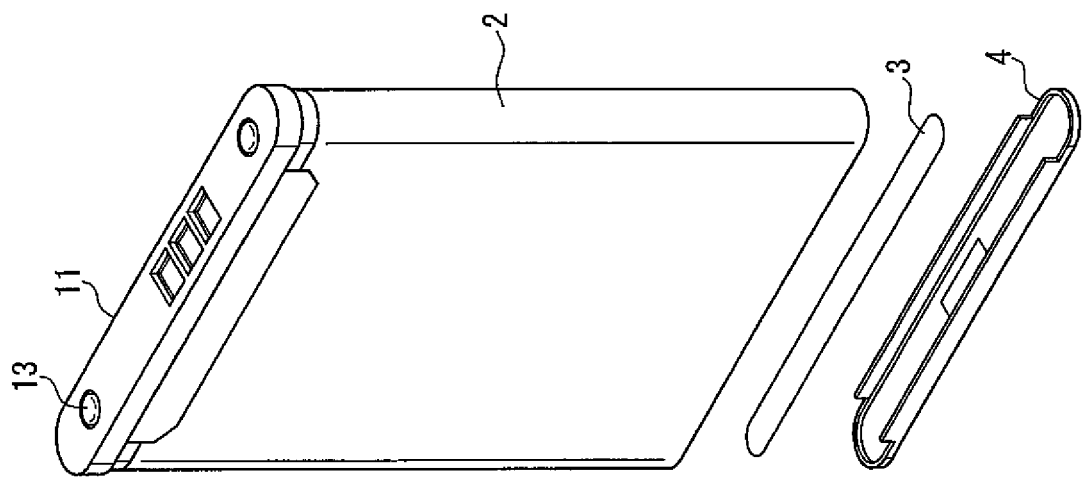

FIGS. 5I and 5J show the steps from the attachment of the can-bottom cover to the completion of the battery pack. As shown in FIG. 5I, the can-bottom cover 4 is attached to the bottom of the unit cell 2 via the double-sided adhesive tape 3. FIG. 5J shows a state where the battery pack 1 is completed with the label 14 (see FIG. 1) being attached to the entire circumference of the unit cell 2.

According to the battery pack of this embodiment, the cover and the internal frame are fixed to each other by melting and deforming the bosses integral with the internal frame. Thus, even with a simple structure, the cover and the internal frame are firmly fixed to each other, and the battery pack also has superior impact resistance. Moreover, according to the battery pack of this embodiment, the number of components can be reduced and the manufacturing process can be simplified when compared with battery packs in which an attaching screw is used or the cover is molded integrally with the unit cell, so the battery pack is also advantageous in terms of cost.

In the description of the foregoing embodiment, an example in which the cover 11 has a shape that covers only the top of the unit cell 2 was used. However, the cover 11 can have any shape as long as it covers at least the top of the unit cell 2, and a case-like cover that covers the entire unit cell 2 may also be used.

As described above, the battery pack of the present invention allows the cover to be firmly fixed with a simple structure and has superior impact resistance. Thus, this battery pack is useful as a battery pack for use in, for example, cellular phones or mobile devices.

The invention may be embodied in other forms without departing from the spirit or essential characteristics thereof. The embodiment disclosed in this application is to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A battery pack in which a protection circuit and a protection element are attached to a unit cell and the protection circuit and the protection element are housed within a cover, the battery pack comprising:
    an internal frame provided within the cover,
    wherein the internal frame is fixed to the unit cell and supports the protection circuit,
    a boss projecting from the internal frame which passes through a hole formed in the cover,
    wherein the hole formed in the cover is in a position depressed below a surface of the cover, and a face that extends directly from a boundary of the hole is inclined with respect to a face containing the boundary of the hole so as to get closer to the surface of the cover as a distance from the boundary of the hole increases, and
    wherein the cover is fixed to the internal frame by melting and deforming the boss.

* * * * *